(12) United States Patent
Yun et al.

(10) Patent No.: US 6,355,380 B1
(45) Date of Patent: Mar. 12, 2002

(54) SOLID POLYMER ALLOY ELECTROLYTE IN HOMOGENEOUS STATE AND HAVING A MONOLAYERED STRUCTURE

(75) Inventors: Kyung Suk Yun; Byung Won Cho; Won Il Cho; Chi Hum Paik; Hyung Sun Kim; Un Sek Kim, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/231,442

(22) Filed: Jan. 14, 1999

(30) Foreign Application Priority Data

Sep. 10, 1998 (KR) .......................................... 98-37423

(51) Int. Cl.[7] .............................................. H01M 10/40
(52) U.S. Cl. ...................................... 429/309; 429/306
(58) Field of Search ................................ 429/306, 188, 429/309

(56) References Cited

U.S. PATENT DOCUMENTS

| | | | | |
|---|---|---|---|---|
| 5,219,679 | A | 6/1993 | Abraham et al. | 429/192 |
| 5,240,790 | A | 8/1993 | Chua et al. | 429/190 |
| 5,296,318 | A | 3/1994 | Gozdz et al. | 429/192 |
| 5,460,904 | A | 10/1995 | Gozdz et al. | 429/192 |
| 5,585,039 | A | 12/1996 | Matsumoto et al. | 252/500 |
| 5,631,103 | A | 5/1997 | Eschbach et al. | 429/190 |
| 5,639,573 | A | 6/1997 | Oliver et al. | 429/190 |
| 5,681,357 | A | 10/1997 | Eschbach et al. | 29/623 |
| 5,834,135 | A | * 11/1998 | Pendalwar | 429/190 |
| 5,837,015 | A | * 11/1998 | Venugopal | 29/623.2 |
| 5,962,168 | A | * 10/1999 | Denton, III | 429/303 |

OTHER PUBLICATIONS

"Fast ion transport in new lithium electrolytes gelled with PMMA. 1. Infuluence of polymer concentration"; O. Bohnde et al, Solid State Ionics 66 (1993), 97–104.

"Fast ion transport in new lithium electrolytes gelled with PMMA. 2. Infuence of lithium salt concentration"; O. Bohnke et al, Solid State Ionics 66 (1993), 97–104.

"Li ion conductivity electrolytes based on Poly(vinyl Chloried)"; M. Alamgir and M. Abraham, J. Electrochem. Soc. vol. 140, No. 6, Jun. 1993.

* cited by examiner

Primary Examiner—Gabrielle Brouillette
Assistant Examiner—Mark Ruthkosky
(74) Attorney, Agent, or Firm—Darby & Darby

(57) ABSTRACT

A homogeneous solid polymer alloy electrolyte comprises a total 100 weight % of mixture of (a) from 5 to 90 weight % comprising one of polyacrylonitrile-based (PAN-based) solid polymers and poly(methyl methacrylate)-based (PMMA-based) solid polymers which have superior adhesion and ion conductivity, (b) from 5 to 80 weight % comprising one of poly(vinylidene fluoride)-based (PVdF-based) solid polymers and the PMMA-based solid polymers which have superior compatibility with an organic solvent electrolyte, (c) from 5 to 80 weight % comprising one of poly(vinyl chloride)-based (PVC-based) solid polymers and the PVdF-based solid polymers which have superior mechanical strength. The solid polymer alloy electrolyte has superior ion conductivity, compatibility with an organic solvent and mechanical strength. A lithium polymer battery manufactured by making the composite anode and cathode using the solid polymer alloy electrolyte, and stacking the solid polymer alloy electrolyte and the composite anode (cathode) in several times, has excellent adhesion, mechanical stability, low/high temperature characteristics, high rate discharge, charge/discharge properties, and battery capacity and battery cycle life characteristics.

2 Claims, 6 Drawing Sheets

SOLID POLYMER ALLOY ELECTROLYTE IN HOMOGENEOUS STATE AND HAVING A MONOLAYERED STRUCTURE

BACKGROUND OF THE INVENTION

1. Field of the Invention

The present invention is directed to an amorphous, homogeneous and compatible solid polymer alloy electrolyte and a manufacturing method therefor, and to a composite electrode, a lithium polymer battery and a lithium ion polymer battery using the same and manufacturing methods therefor.

2. Description of the Background Art

A conventional solid polymer electrolyte for a lithium battery and the like has been mostly manufactured of polyethylene oxide (PEO), but recently a solid polymer electrolyte in a gel- or hybrid-type which has ion conductivity greater than $10^{-3}$ S/cm at an ambient temperature is being developed. Especially, the solid polymer electrolytes which can be employed for a lithium polymer battery are a polyacrylonitrile-based (hereinafter, referred to as "PAN") solid polymer electrolyte in a gel-type which was described in U.S. Pat. No. 5,219,679 of K. M. Abraham et al. and U.S. Pat. No. 5,240,790 of D. L. Chua et al., and a polyvinylidene fluoride-based (hereinafter, referred to as "PVdF") solid polymer electrolyte in a hybrid-type which was described in U.S. Pat. Nos. 5,296,318 and 5,460,904 of A. S. Gozdz et al., the disclosures of which are incorporated hereinto by reference.

The gel-type PAN-based electrolyte has excellent adhesion, so that a composite electrode can be firmly adhered to a metal substrate. There are thus advantages in that a contact resistance is small in charging or discharging a battery and an active material is less separated. However, the electrolyte is more or less soft, thereby reducing mechanical stability, namely strength. Such weak strength may cause a serious problem in manufacturing the electrode and battery.

The hybrid-type PVdF-based electrolyte is manufactured by making a polymer matrix have a porosity of less than a submicron and by injecting an organic solvent electrolyte into the pore. It has excellent compatibility with the organic solvent electrolyte, and can be stably used because the organic solvent electrolyte injected into the small pores does not leak. Besides the polymer matrix can be manufactured in the ambient atmosphere because the organic solvent electrolyte is later injected. However, a manufacturing process therefor is quite complicated, that is a process for extracting a plasticizer and a process for infiltrating the organic solvent electrolyte are required in manufacturing the solid polymer matrix. In addition, while the mechanical strength of the PVdF-based electrolyte is quite excellent, the adhesion thereof is inferior, thereby requiring a process for making a thin layer by heating and the extracting process in manufacturing the electrode and battery.

According to an article in *Solid State Ionics*, 66, 97, 105(1993) by O. Bohnke, G. Frand et al., a poly(methyl methacrylate)-based (hereinafter, referred to as "PMMA") solid polymer electrolyte has an ion conductivity of approximately $10^{-3}$ S/cm at an ambient temperature, strong adhesion and excellent compatibility with the organic solvent electrolyte. However, the mechanical strength thereof is extremely weak, and thus not appropriate for a lithium polymer battery. In addition according to an article in *J. Electrochem. Soc.*, 140, L96(1993) by M. Alamgir and K. M. Abraham, a poly(vinylchloride)-based (hereinafter, referred to as "PVC") solid polymer electrolyte has an ion conductivity of approximately $10^{-3}$ S/cm at an ambient temperature and excellent mechanical strength. However, there are disadvantages in that the low temperature characteristics are inferior and the contact resistance is great.

Also a solid polymer electrolyte manufactured by a blending was develpoed. For instance, U.S. Pat. No. 5,585,039 of M. Matsumoto et al. which was filed by NTT in Japan is directed to a solid polymer electrolyte including a multi-phase polymer matrix and an organic solvent electrolyte solution. The poly-phase polymer matrix includes a highly polar polymeric (HPP) phase and a less polar polymeric (LPP) phase. The HPP phase exhibits ion conductivity by infiltrating the organic solvent electrolyte, and the LPP phase is used as a supporting body. Accordingly, the polymers which are generally used for manufacturing the solid polymer electrolyte, such as PEO, PAN, PVdF, polypropylene oxide and the like are employed for the HPP phase. The polymers which are used as a supporting body, such as polystyrene, polypropylene, polyethylene and the like can be utilized for the LPP phase. Such a solid polymer electrolyte has an ion conductivity between $10^{-4}$ and $10^{-3}$ S/cm at an ambient temperature which is not sufficient for a lithium polymer battery. Especially, the ion conductivity at a temperature below 0° C. is inferior. This solid polymer electrolyte is unsatisfactory for the lithium polymer battery because it does not have the essential characteristics which the lithium polymer battery should have, such as adhesion to the electrode, compatibility with the organic solvent and mechanical strength. Besides, this solid polymer electrolyte is poly-phased, and the polymers are in separated phases, and thus the phase separation proceeds by the repetition of the charge/discharge cycle and temperature cycle. As a result, the battery performance is rapidly deteriorated.

On the other hand, U.S. Pat. Nos. 5,631,103, 5,639,573 and 5,681,357 of M. Oliver et al. of Motorola in U.S.A. are basically identical in concept to the above-described invention of NTT in Japan, namely directed to a method for manufacturing a blended solid polymer electrolyte. The solid polymer electrolyte according to the above-mentioned patents includes two different phases. A first phase serves to absorb the organic solvent electrolyte and a second phase does not absorb the organic solvent electrolyte Without reactivity, and serves to prevent a gel electrolyte from being expanded, to be used as a supporting body and to increase the mechanical hardness. The first phase generally includes PVdF, polyurethane, PEO, PAN and the like which are used for manufacturing the solid polymer electrolyte, and the second phase includes polyethylene, polypropylene, polytetrafluoro-ethylene (PTFE) and the like. This solid polymer electrolyte has an ion conductivity of approximately $10^{-4}$ S/cm at an ambient temperature, and thus is more or less weak for an ambient temperature type lithium polymer battery. Especially, the ion conductivity at a temperature below 0° C. is inferior. Besides, the solid polymer electrolyte does not have the essential properties for the lithium polymer battery, such as adhesion to the electrode, compatibility with the organic solvent electrolyte and mechanical strength, similarly to the solid polymer electrolyte of NTT in Japan, and thus is not suitable for a lithium polymer electrolyte. In addition, the solid polymer electrolyte includes a heterogeneous phase, and thus the phase separation is increased by the repetition of the charge/discharge cycle and temperature cycle, which rapidly reduces the battery performance.

On the other hand, a conventional normal temperature type lithium secondary battery has been firstly developed by Sony in Japan. Here, a lithium ion battery has been world-widely used and a lithium polymer battery is expected to be widely used in a few years.

The lithium ion battery is a separator, namely a PE (polyethylene) or PP (polypropylene) separator is used. It is difficult to manufacture a battery by stacking the electrode and separator in a flat-plate form. Therefore, the battery is manufactured by rolling up the electrode and separator and inserting them into a cylindrical or rectangular tube (D. Linden, *Handbook of Batteries*, McGRAW-HILL INC., New York(1995)). Although the lithium ionic battery has been widely used, there are still some problems for safety. Besides, the process for manufacturing the battery is complicated, which results in low productivity. Further, the battery shape is limitedly selected and the battery capacity is restricted. The lithium polymer battery is expected to overcome the above-described disadvantages. The lithium polymer battery employs a solid polymer electrolyte which functions as both the separator and electrolyte. The battery can be manufactured by stacking the electrode and polymer electrolyte in a flat-plate form. In addition, the manufacturing method therefor is similar to the method for manufacturing the polymer film, which results in enhanced productivity. However, it is not yet widely used because a solid polymer electrolyte has not been developed which has adhesion to the electrode, mechanical strength, low and high temperature characteristics and compatibility with the organic solvent electrolyte for the lithium secondary battery.

Recently, there has been developed the hybrid-type PVdF-based solid polymer electrolyte which was described in U.S. Pat. Nos. 5,296,318 and 5,460,904 of A. S. Gozdz et al. There is thus a plan to mass-produce the hybrid-type lithium polymer battery sooner or later. However, according to this battery system, a plasticizer is used in manufacturing the solid polymer electrolyte and cathode/anode, and thus a process for extracting the plasticizer and a process for infiltrating the organic solvent electrolyte are further required, which results in a complicated manufacturing process. Besides the PVdF-based electrolyte has a strong mechanical strength, but inferior adhesion. Accordingly, a process for making a thin film by heating needs to be carried out in manufacturing the electrode and battery. The battery performance is reduced because the electrode and solid polymer electrolyte are separated during the extracting process. In addition there is a disadvantage in that the porosity in the electrode is relatively high, as compared with the lithium ion battery, and thus the organic solvent electrolyte is much infiltrated, thereby decreasing energy density and deteriorating high-rate charge/discharge characteristics. Furthermore, the hybrid-type PVdF-based electrolyte has inferior low and high temperature characteristics.

SUMMARY OF THE INVENTION

It is therefore a primary object of the present invention to provide a solid polymer alloy electrolyte in a homogeneous state which has superior properties, such as ion conductivity, adhesion to the electrode, compatibility with an organic solvent electrolyte, mechanical strength and the like, and a manufacturing method therefor.

It is another object of the present invention to provide a composite cathode and a composite anode using the solid polymer electrolyte manufactured according to the present invention, and a manufacturing method therefor.

It is still another object of the present invention to provide a high performance lithium polymer battery which has excellent energy density, cycle life characteristics, low and high temperature characteristics, and high-rate discharge characteristics, by using the solid polymer alloy electrolyte and composite cathode(anode) according to the present invention, and a manufacturing method therefor.

It is still another object of the present invention to provide a lithium ion polymer battery which makes the best use of the above-described advantages of the lithium ion battery and lithium polymer battery and has superior energy density, cycle life, low and high temperature characteristics, high-rate discharge characteristics and stability, and a manufacturing method therefor. The method for manufacturing a lithium ion polymer battery according to this invention is relatively simple and an enlargement of the battery is possible.

BRIEF DESCRIPTION OF THE DRAWINGS

The present invention will become better understood with reference to the accompanying drawings which are given only by way of illustration and thus are not limitative of the present invention, and wherein:

FIGS. 5a to 5c respectively illustrate processes for manufacturing a lithium ion polymer battery, wherein:

FIG. 5a illustrates a process for forming a solid polymer alloy electrolyte/anode/solid polymer alloy electrolyte structure by a lamination process, and then for alternatively-stacking the structure with a cathode;

FIG. 5b illustrates a process for forming an anodal/solid polymer alloy electrolyte structure and a cathode/solid polymer alloy electrolyte structure, and then for alternatively-stacking the two structures; and FIG. 5c illustrate a process for forming a cathode/solid polymer alloy electrolyte/anode/solid polymer alloy/cathode structure, and then alternatively-stacking the structure.

DETAILED DESCRIPTION OF THE INVENTION

Figure 1:
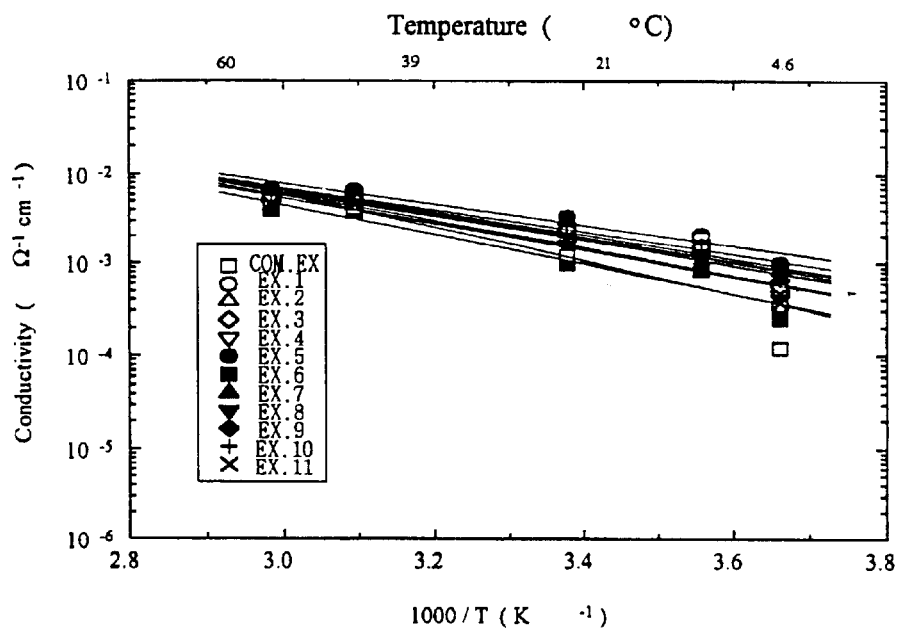
FIG. 1 is a graph illustrating the ion conductivity of a solid polymer alloy electrolyte in a homogeneous state according to the present invention.

When it is presumed that a total weight of a polymer mixture is 100 weight %, a solid polymer alloy electrolyte according to the present invention comprises a mixture of function-I polymers in an amount of from 5 to 90 weight % comprising one selected from the groups of polyacrylonitrile-based (hereinafter, referred to as "PAN") polymers and poly(methyl methacrylate)-based (hereinafter, referred to as "PMMA") polymers which have superior adhesion and ion conductivity; function-II polymers in an amount of from 5 to 80 weight % comprising one selected from the group of polyvinylidene fluoride-based (hereinafter, referred to as "PVdF") polymers and the PMMA-based polymers which have superior compatibility with an organic solvent electrolyte; and function-III polymers in an amount of from 5 to 80 weight % comprising one selected from the groups of poly(vinylchloride)-based (hereinafter, referred to as "PVC") polymers and the PVdF-based polymers which have superior mechanical strength.

The PAN-based polymers are selected from the groups of polyacrylonitrile and poly(acrylonitrile-co-methyl acrylate), the PMMA-based polymers are selected from % the groups of poly(methylmethacrylate), poly(methylmethacrylate-co-ethylacrylate) and poly(methylmethacrylate-co-methacrylicacid), the PVdF-based polymers are selected from the groups of poly(vinylidene fluoride) and poly(vinylidenefluoride-co-hexafluoropropylene), and the PVC-based polymers are selected from the groups of poly(vinylchloride) and poly(vinylidene chloride-co-acrylonitrile).

The mixing ratio of the polymers mixture is dependent upon the physical properties of the solid polymer alloy electrolyte to be required. When the good adhesion is required, a composition ratio of the function-I (PAN-based or PMMA-based) polymers increases. In the case that the compatibility with the organic solvent electrolyte is preferentially required, a composition ratio of the function-II (PMMA-based or PVdF-based) polymers increases. Besides when the mechanical strength is firstly required, a composition ratio of the function-III (PVdF-based or PVC-based) polymers increases.

A plasticizer, organic solvent electrolyte, $SiO_2$ or $Al_2O_3$ and the like can be further added to the solid polymer alloy electrolyte according to the present invention, if necessary.

The plasticizer comprises one or more elements selected from the groups of dimethyl acetamide (DMA), N,N-dimethylformamide (DMF), dimethyl carbonate (DMC), ethylene carbonate (EC), ethyl methyl carbonate (EMC), propylene carbonate (PC) and acetonitrile (AN). The quantity of the plasticizer to be added is approximately one to five times (100 to 500 weight %) as much as the polymer mixture comprising function-I polymers/function-II polymers/function-III polymers.

The organic solvent electrolyte comprises one or more elements selected from the groups of an ethylene carbonate-dimethyl carbonate (hereinafter, referred to as "EC-DMC") solution in which a lithium salt is dissolved, an ethylene carbonate-diethyl carbonate (hereinafter, referred to as "EC-DEC") solution in which the lithium salt is dissolved, and an ethylene carbonate-ethylmethyl carbonate (hereinafter, referred to ais "EC-EMC") solution in which the lithium salt is dissolved. In addition, the solutions above may further contain one or more composites selected from the group comprising methyl acetate (MA), methyl propionate (MP), ethyl acetate (EA) and ethyl propionate (EP), in order to improve low temperature characteristics of the above-mentioned solutions. The quantity of the organic solvent to be added is approximately one to five times (100 to 500 weight %) as much as the polymer mixture comprising function-I polymers/function-II polymers/function-III polymers. The relative composition ratio of the polymer mixture comprising function-I polymers/function-II polymers/function-III polymers and the organic solvent electrolyte containing the lithium salt influences on the ion conductivity and mechanical stability. In case the composition ratio of the polymer mixture rises, the mechanical stability is improved but the ion conductivity is reduced. On the other hand, in case the composition ratio of the organic solvent containing lithium salt increases, the ion conductivity is improved but the mechanical stability is reduced.

In addition, in order to improve the mechanical strength and ion conductivity of the solid polymer alloy electrolyte, $SiO_2$ or $Al_2O_3$ can be added as much as approximately 0 to 20 weight % of the polymer mixture comprising functions polymers/function-II polymers/function-III polymers.

A method for manufacturing the above-described solid polymer alloy electrolyte according to the present invention will now be described.

As discussed above, the polymer mixture (of 100 weight %) including the function-I polymers in an amount of from 5 to 90 weight % comprising one of the PAN-based polymers and the PMMA-based polymers which have the superior adhesion and ion conductivity, the function-II polymers in an amount of from 5 to 80 weight % comprising one of the PVdF-based polymer and the PMMA-based polymer which have the superior compatibility with the organic solvent electrolyte, and the function-III polymers in an amount of from 5 to 80 weight % comprising one of the PVC-based polymer and the PVdF-based polymer which have the superior mechanical strength; optionally, the plasticizer greater in weight than the polymer mixture by one to five times; the organic solvent electrolyte which is also in an amount greater in weight than the polymer mixture by one to five times; and $SiO_2$ or $Al_2O_3$ in an amount of from 0 to 20 weight % of the polymer mixture are sufficiently mixed (preferably for more than 12 hours), heated to a temperature between 100° C. and 180° C., and then a polymer blending thereof is carried out for 10 minutes to 2 hours. When a matrix of the solid polymer alloy electrolyte is sufficiently formed, and the viscosity thereof is similar to honey, a casting by way of a die-casting or doctor blade method is carried out, and thus a solid polymer alloy electrolyte film is manufactured. This solid polymer alloy electrolyte film is used for manufacturing the lithium polymer battery, which will be described below.

The solubility parameter is an important factor in polymer blending. Referring to *CRC Handbook of Polymer-Liquid Interaction Parameters and Sollibility Parameters* of A. F. M. Baton et al., the Hilderbrand parameter has the values '23.3~31.5 $MP_a^{1/2}$', '18.6~26.3 $MP_a^{1/2}$', '12~30 $MP_a^{1/2}$' and '19.1~22.1 $MP_a^{1/2}$' in PAN, PMMA PVdF-based P(VdF-HFP) and PVC, respectively. Accordingly, by appropriately determining the plasticizer and solvent, and blending condition, a polymer alloy electrolyte in an homogeneous state can be manufactured.

According to the present invention, there is also provided a composite anode and a composite cathode using the above-described solid polymer alloy electrolyte, and a manufacturing method therefor will now be described.

The composite anode comprises: an anode active material in an amount of from 25 to 35 weight % comprising one or more materials preferably selected from a graphite, a coke, a hard carbon and a tin oxide; a electrically conductive material in an amount of from 0.5 to 2 weight % comprising one or more materials selected from an acetylene black and a graphite; the solid polymer alloy electrolyte of the present invention in an amount of from 15 to 25 weight %; and the plasticizer in an amount as much as the remaining weight % which comprises one or more materials selected from the groups of DMA, DMF, DMC, EC, EMC, PC and AN.

In order to manufacture the composite anode of the present invention, the above-mentioned materials are mixed together and heated at a temperature between 100–180° C. for 10 minutes to 2 hours. When the matrix of the solid polymer alloy electrolyte is fully formed, and the viscosity thereof is similar to honey, the matrix of the solid polymer alloy electrolyte is cast on both sides of a copper grid utilizing a die-casting or doctor blade method, and then it is dried and rolled, whereby forming of the composite anode of the present invention is completed.

The composite cathode includes: a cathode active material in an amount of from 25 to 35 weight % comprising one or more elements preferably selected from the group of $LiCoO_2$, $LiMn_2O_4$, $LiNiO_2$, $V_2O_5$ and $V_6O_{13}$; a conductive material in an amount of from 0.5 to 2 weight % comprising one or more materials selected from the acetylene black and graphite; the solid polymer alloy electrolyte of the present invention in an amount of from 15 to 25 weight %; and the plasticizer in an amount as much as the remaining weight % which comprises an element selected from the group of DMA, DMF, DMC, EC, EMC, PC and AN.

In order to manufacture a composite cathode of the present invention, the above-mentioned materials are mixed together and heated at a temperature between 100–180° C. for 10 minutes to 2 hours. When the matrix of the solid polymer alloy electrolyte is fully formed and the viscosity thereof is similar to honey, the matrix of the solid polymer alloy electrolyte is cast on both sides of an aluminum grid utilizing a die-casting or doctor blade method, and then it is dried under the ambient temperature for 1 to 24 hours and rolled under a pressure of 0.1 to 5 kg/cm$^2$, whereby manufacturing of the composite cathode of the present invention is completed. The thusly manufactured composite anode and cathode may be utilized to manufacture the lithium (ion) polymer battery according to the present invention.

The lithium polymer battery manufactured by using the homogeneous solid polymer alloy electrolyte according to the present invention will now be described.

The lithium polymer battery is manufactured by sequentially stacking layers (i.e., laminating) in the order of composite anode/solid polymer alloy electrolyte/composite cathode/solid polymer alloy electrolyte/composite anode, and inserting the stacked layers into a blue bag and vacuum-sealing it, by using the solid polymer alloy electrolyte(film) and composite anode(cathode). Here, an anode including a lithium, a lithium alloy, or a mixture thereof can replace the composite anode.

In addition, the lithium ion polymer battery can be manufactured by sequentially stacking layers in the order of anode/homogeneous solid polymer alloy electrolyte of the present invention/cathode/homogeneous solid polymer alloy electrolyte of the present invention/anode, inserting the stacked layers into the blue bag, injecting the organic solvent electrolyte in order for it to be infiltrated into the anode and cathode, and vacuum-sealing the bag, by using the conventional anode and cathode generally used for the lithium ion battery. In this case, the anode and cathode to be used for manufacturing the lithium ion polymer battery are made by mixing a certain amount of an active material, an electrically conductive material, an adhesive and an organic solvent together, carrying out a casting on both sides of the copper and aluminum thin plate grids, and drying and rolling it, which is generally used in the manufacturing process of the conventional lithium ion battery. In more detail, the anode comprises one or more elements selected from the group of a graphite, a coke, a hard carbon, a tin oxide, a pre-lithiated material thereof, a lithium, and a lithium alloy. The cathode comprises one or more elements selected from the group of $LiCoO_2$, $LiNiO_2$, $LiMn_2O_4$, $V_2O_5$ and $V_6O_{13}$.

Figure 5A:
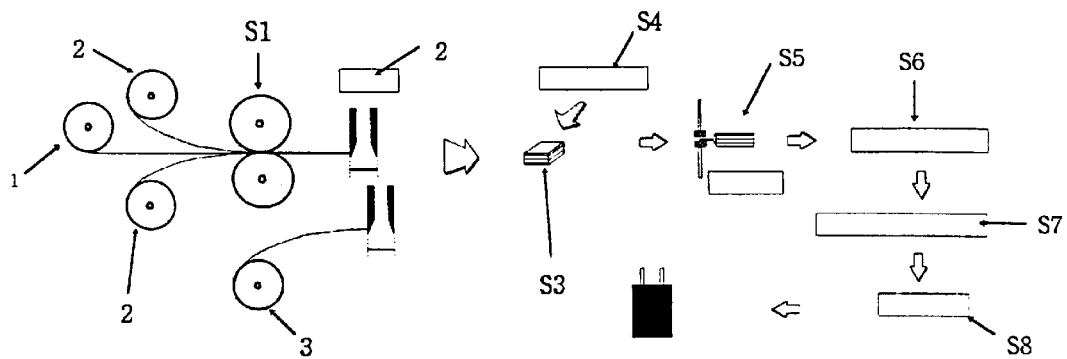
Figure 5B:
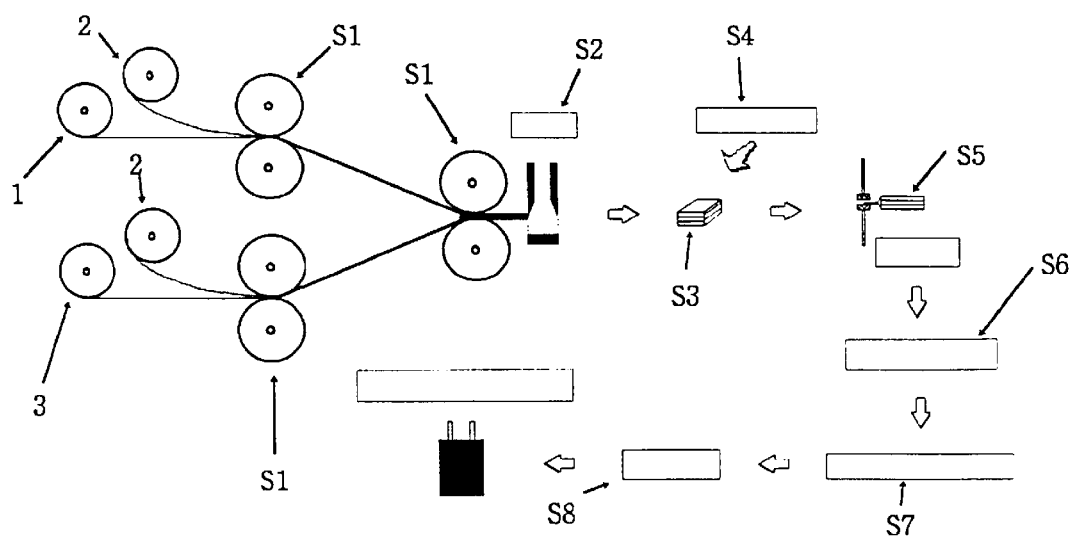
Figure 5C:
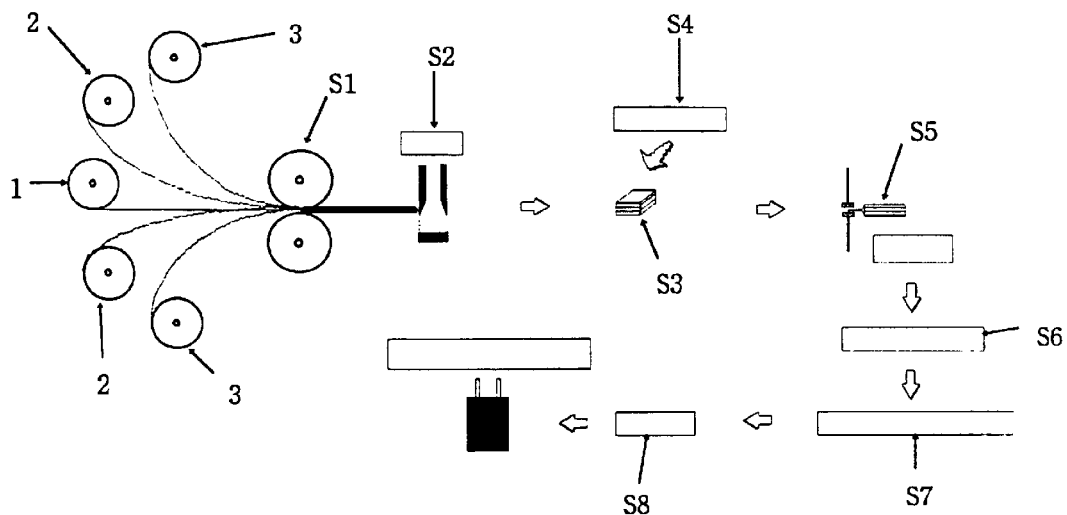

FIGS. 5a to 5c respectively illustrate three processes for manufacturing the lithium polymer battery or lithium ion polymer battery according to the present invention. In the drawings FIGS. 5a to 5c, an anode roll (1), a solid polymer alloy electrolyte roll (2), a cathode roll (3) are provided, and the S1 indicates a lamination process, S2 a cutting of the laminated structure or cathode, S3 a stacking of the cut structures, S4 a injecting of the organic solvent electrolyte, S5 a welding of terminals to respective anode and cathode, S6 inserting in a battery casing, S7 a injecting of the organic solvent electrolyte, S8 a vacuum sealing. According to a first manufacturing method in FIG. 5a, the solid polymer alloy electrolyte is bonded to each side of the anode by a continuous lamination process, and thus forming a single structure. The bonded polymer alloy electrolyte/anode/solid polymer alloy electrolyte structure and the cathode are cut to a predetermined size and alternatively-stacked a few times for forming a stacked structure. Then, terminals are connected to the anode and cathode respectively, and the stacked structure is inserted into a battery casing. The organic solvent electrolyte is then injected thereinto. The injection process of the organic solvent electrolyte can be accomplished at the time of stacking the anode and cathode. In the case of the lithium polymer battery using the above-described composite anode and cathode, the organic solvent electrolyte may not be injected. Then, the manufacturing of the lithium polymer battery or lithium ion polymer battery is completed by vacuum-sealing process.

According to a second manufacturing process illustrated in FIG. 5b, the solid polymer alloy electrolyte is bonded to one side of the anode by a continuous lamination process, thus forming a single structure. Similarly, the solid polymer alloy electrolyte is bonded to one side of the cathode by a continuous lamination process, thus forming a single structure. Two bonded single structures are cut to a predetermined size and alternatively-stacked a few times for forming a stacked structure. Then, the terminals are connected to the anode and cathode respectively, and the stacked structure is inserted into the battery casing. The organic solvent electrolyte is then injected thereinto. The injection process of the organic solvent electrolyte can be accomplished at the time of stacking the anode and cathode structures. In the case of the lithium polymer battery using the above-described composite anode and cathode, the organic solvent electrolyte may not be injected. Then, the manufacturing of the lithium polymer battery or lithium ion polymer battery is completed by a vacuum-scaling process.

According to a third manufacturing method illustrated in FIG. 5c, the solid polymer alloy electrolyte is positioned on the both sides of the anode, and the cathode is positioned on the solid polymer alloy electrolyte layer of each side. The thusly positioned elements are bonded by the lamination process, thus forming a single structure, i.e., cathode/solid polymer alloy electrolyte/anode/solid polymer alloy electrolyte/cathode structure. The single structure is cut to a predetermined size and alternatively-stacked several times for forming a stacked structure. The terminals are connected to the anode and cathode respectively, and the stacked structure is inserted into a battery casing, and then, the organic solvent electrolyte is inserted thereinto. The injection process of the organic solvent electrolyte can be accomplished at the time of stacking the anode and cathode. In the case of the lithium polymer battery using the above-described composite anode and cathode, the organic solvent electrolyte may not be injected. The manufacturing of the lithium polymer battery or lithium ion polymer battery according to the present invention is completed by vacuum-sealing process.

The organic solvent electrolyte to be injected comprises one solution selected from the group of an EC(ethylene carbonate)-DMC(dimethyl carbonate) solution in which a lithium salt is dissolved, an EC(ethylene carbonate)-DEC (diethyl carbonate) solution in which a lithium salt is dissolved, and an EC(ethylene carbonate)-EMC (ethylmethyl carbonate) solution in which a lithium salt is dissolved. In addition, the solutions above may further contain one or more composite selected from the group comprising methyl acetate (MA), methyl propionate (MP), ethyl acetate (EA) and ethyl propionate (EP) in order to improve low temperature characteristics of the above-mentioned solutions.

A plate, a punched plate or an expanded mesh plate can be used as the copper and aluminum grids. In the case that the organic solvent electrolyte is injected after stacking, the punched plate and expanded plate are more preferable in order to enable efficiently injecting the solution.

The present invention will be concretely described by the examples discussed below. However, it should be recognized that the present invention is not limited by the following examples.

EXAMPLES

Example 1

1.5 g of Polyacrylonitrile (purchased from Polyscience Company, molecular weight: 150,000, and hereinafter referred to as "PAN") as the PAN-based polymer, 1.5 g of poly(vinylidene fluoride-hexafluoropropylene) (Atochem Kynar 2801; hereinafter referred to as "P(VdF-HFP)") as the PVdF-based polymer, 0.15 g of silica, EC-DMC solution in an amount of 6 g which contained a resolved LiPF6 of 1M, and DMA solution 1in an amount of 0 g as plasticizer were admixed for about 12 hours. The mixture was heated for about one hour at a temperature of 130° C. to form a matrix of the solid polymer alloy electrolyte. When the matrix became as viscous as honey for thereby facilitating the subsequent casting, the matrix was cast using a doctor blade method and dried for about 12 hours at ambient temperature, whereby a solid polymer alloy electrolyte film was produced.

In order to form the carbon composite anode, Gr (graphite) in an amount of from 6 g, AB(acetylene black) in an amount of from 0.3 g, the solid polymer alloy electrolyte 3.7 g which was produced as above, and DMA solution in an amount of 10 g as plasticizer were admixed. The mixture is heated for about one hour at a temperature of 130° C. to sufficiently form a matrix of the solid polymer alloy electrolyte. When the matrix became as viscous as honey for thereby facilitating the subsequent casting, the matrix was casted on a copper plate using a doctor blade method and dried for about 12 hours at an ambient temperature, and rolled under a pressure of about 1 kg/cm$^2$, thereby obtaining a composite electrode. In order to form the LiCoO$_2$ composite cathode, LiCoO$_2$ in an amount of 5.77 g, AB in an amount of 0.6 g, the solid polymer alloy electrolyte in an amount of 3.7g which was prepared as above, and DMA solution in an amount of 10 g as plasticizer were admixed. The mixture was heated for about one hour at a temperature of 130° C. to sufficiently form a matrix of the solid polymer alloy electrolyte. When the matrix became as viscous as honey for thereby facilitating the subsequent casting, the matrix was cast on an aluminum plate using a doctor blade method, dried for about 12 hours at an ambient temperature, and rolled under a pressure of about 1 kg/cm$^2$, whereby the composite cathode was obtained.

For manufacturing a lithium polymer battery, the solid polymer alloy electrolyte was provided on both sides of the carbon composite anode and a lamination process was performed for bonding and forming a solid polymer alloy electrolyte/composite anode/solid polymer alloy electrolyte structure, and then the structure was cut to a size of 3 cm×8 cm, and the composite cathode as above is cut by a size of 2.8 cm×8 cm. The cut solid polymer alloy electrolyte/ composite anode/solid polymer alloy electrolyte structure and the composite cathode were alternately stacked for forming a stacked structure. After the stacking, terminals were respectively connected to the anode and cathode and the terminal-connected stacked structure was placed into a blue bag and vacuum sealed for thereby fabricating a lithium polymer battery. The charge/discharge test for the battery was carried out using a charge/discharge method in which the battery was charged under C/3 constant current and 4.2V constant voltage and discharged under C/3 constant current, whereby the electrode capacity and the cycle life on the basis of the cathode were determined.

Example 2

1.5 g of PAN, 1.0 g of P(VdF-HFP), and 0.5 g of poly(vinyl chloride) (purchased from Aldrich Company, molecular weight: 150,000, and hereinafter referred to as "PVC") were admixed, and 0.15 g of silica, 6.0 g of EC-DMC solution dissolved by 1M LiPF$_6$, and 10 g of DMA solution as plasticizer are further admixed. The mixture was mixed for about 12 hours and heated for about one hour at a temperature of 130° C. to form a matrix of the solid polymer alloy electrolyte. When the matrix became as viscous as honey for thereby facilitating the subsequent casting, casting of the matrix was carried out using a doctor blade method and the cast matrix was then dried for about 12 hours at ambient temperature, whereby a solid polymer alloy electrolyte film was fabricated.

In order to form the carbon composite anode, Gr (graphite) in an amount of 6 g, AB (acetylene black) in an amount of 0.3 g, the solid polymer alloy electrolyte (structured as above) in an amount of 3.7 g, and DMA solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at ambient temperature, and then rolled under a pressure of about 1 kg/cm$^2$. In order to form an LiCoO$_2$ composite cathode, LiCoO$_2$ in an amount of 5.77 g, AB in an amount of 0.6 g, the solid polymer alloy electrolyte (structured as above) in an amount of 3.7 g, and DMA solution in an amount of 10 g as plasticizer were mixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at ambient temperature, and then rolled under a pressure of about 1 kg/cm$^2$.

The battery fabrication and charge/discharge test were carried out using the methods identical to those in Example 1.

Example 3

1.5 g of PAN, 0.6 g of poly(methyl methacrylate) (available from Polyscience Company, molecular weight: 100,000, and hereinafter referred to as "PMMA"), and 0.9 g of P(VdF-HFP) were admixed, and 0.15 g of silica, 6 g of EC-DMC solution dissolved by 1M LiPF$_6$, and 10 g of DMA solution as plasticizer were further admixed. The mixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method and dried for about 12 hours at an ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (structured as above) in an amount of 3.7 g, and DMA solution in an amount of 10 g as plasticizer were admixed and heated for about one hour at a temperature of 130° C. to sufficiently form a solid polymer alloy electrolyte matrix. When the matrix became a material having as much viscosity as honey for thereby facilitating the subsequent casting, the matrix was cast on a copper plate using a doctor blade method, dried for about 12 hours at an ambient temperature, and then rolled under a pressure of about 1 kg/cm$^2$. In order to form an LiCoO$_2$ composite cathode, LiCoO$_2$ in an amount of 5.7 g, AB in an amount of 0.6 g, the solid polymer alloy electrolyte (structured as above) in an amount of 3.7 g, and DMA solution in an amount of 10 g as plasticizer were admixed and heated for about one hour at a temperature of 130° C. to sufficiently form a solid polymer alloy electrolyte matrix. When the matrix became as viscous as honey for thereby facilitating the Subsequent casting, the matrix was cast on an aluminum plate using a doctor blade method, dried for about 12 hours at an ambient temperature, and then rolled under a pressure of about 1 kg/cm$^2$.

The battery fabrication and charge/discharge test were carried out using the method identical to that of Example 1.

Example 4

1.5 g of PAN, 1.0 g of PMMA and 10 g of PVC were admixed, and 0.15 g of silica, 6.0 g of EC-DMC solution dissolved by 1M LiPF$_6$, and 10 g of DMA solution as plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (structured as above) in an amount of 3.7 g, and DMA solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at an ambient temperature, and then rolled under a pressure of about 1 kg/cm$^2$. In order to form an LiCoO$_2$ composite cathode, LiCoO$_2$ in an amount of 5.7 g, AB in an amount of 0.6 g, the solid polymer alloy electrolyte in an amount of 3.7 g as structured above, and DMA solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at an ambient temperature, and then rolled under a pressure of about 1 kg/cm$^2$.

The battery fabrication and charge/discharge test were carried out using the method identical to that of Example 1.

Example 5

1.5 g of PMMA, 0.9 g of P(VdF-HFP), and 0.6 g of PVC were admixed, and 0.15 g of silica, 6.0 g of EC-DMC solution dissolved by 1M LiPF$_6$, and 10 g of DMA solution as plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting,the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (as structured above) in an amount of 3.7 g, and DMA solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting,the matrix was cast on a copper plate using a doctor blade method, dried for about 12 hours at ambient temperature, and then rolled under a pressure of about 1 kg/cm$^2$. In order to form an LiCoO$_2$ composite cathode, LiCoO$_2$ in an amount of 5.7 g, AB in an amount of 0.6 g, the solid polymer alloy electrolyte in an amount of 3.7 g as structured above, and DMA solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting,the matrix was cast on an aluminum plate using a doctor blade method, dried for about 12 hours at ambient temperature, and then rolled under a pressure of about 1 kg/cm$^2$.

The battery fabrication and charge/discharge test were carried out using the method identical to that of Example 1.

Example 6

2.0 g of PMMA and 1.0 g of P(VdF-HFP) were admixed, and 0.15 g of silica, 6.0 g of EC-DMC solution dissolved by 1M LiPF$_6$, and 10 g of DMA solution as a plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting,the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (as structured above) in an amount of 3.7 g, and DMA solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at ambient temperature, and then rolled under a pressure of about 1 kg/cm$^2$. In order to form an $LiCoO_2$ composite cathode, $LiCoO_2$ in an amount of 5.7 g, AB in an amount of 0.6 g, the solid polymer alloy electrolyte in an amount of 3.7 g as structured above, and DMA solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at ambient temperature, and then rolled under a pressure of about 1 kg/cm$^2$.

The battery fabrication and charge/discharge test were carried out using the method identical to that of Example 1.

Example 7

1.0 g of PAN, 0.5 g of PMMA, 1.0 g of P(VdF-HFP), and 0.5 g of PVC were admixed, and 0.15 of silica, 6.0 of EC-DMC solution dissolved by 1M $LiPF_6$, and 10 g of DMA solution as a plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (as structured above) in an amount of 3.7 g, and DMA solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at ambient temperature, and then rolled under a pressure of about 1 kg/cm$^2$. In order to form an $LiCoO_2$ composite cathode, $LiCoO_2$ in an amount of 5.7 g, AB in an amount of 0.6 g, the solid polymer alloy electrolyte in an amount of 3.7 g as structured above, and DMA solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at ambient temperature, and then rolled under a pressure of about 1 kg/cm$^2$.

The battery fabrication and charge/discharge test were carried out using the method identical to that of Example 1.

Example 8

1.0 g of PAN, 0.5 g of PMMA, 1.0 g of P(VdF-HFP), and 0.5 g of PVC were admixed, and 0.15 of silica, 6.0 g of EC-DMC solution dissolved by 1M $LiPF_6$, and 10 g of EC-DMC solution as a plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.33 g, the solid polymer alloy electrolyte (as structured above) in an amount of 3.7 g, and EC-DMC solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at ambient temperature, and then rolled under a pressure of about 1 kg/cm$^2$. In order to form an $LiCoO_2$ composite cathode, $LiCoO_2$ in an amount of 5.7 g, AB in an amount of 0.6 g, the solid polymer alloy electrolyte in an amount of 3.7 g as structured above, and EC-DMC solution in an amount of 10 g as a plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at ambient temperature, and then rolled under a pressure of about 1 kg/cm$^2$.

The battery fabrication and charge/discharge test were carried out using the same method as in Example 1.

Example 9

1.0 g of PAN, 0.5 g of PMMA, 1.0 g of P(VdF-HFP), and 0.5 of PVC were admixed, and 0.15 g of silica, 6 g of EC-EMC solution dissolved by 1M $LiPF_6$, and 10 g of EC-EMC solution as a plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form the carbon composite anode, Gr (graphite) in an amount of 6 g, AB (acetylene black) in an amount of 0.3 g, the solid polymer alloy electrolyte (as structured above) in an amount of 3.7 g, and EC-EMC solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on a copper plate using a doctor blade method, dried for about 12 hours at ambient temperature, and then rolled under a pressure of about 1 kg/cm$^2$. In order to form the $LiCoO_2$ composite cathode, $LiCoO_2$ in an amount of 5.7 g, AB in an amount of 0.6 g, the solid polymer alloy electrolyte in an amount of 3.7 g as structured above, and EC-EMC solution in an amount of 10 g as plasticizer were admixed and heated for about one hour at a temperature of 130° C. to sufficiently form a solid polymer alloy electrolyte matrix. When the matrix became as viscous as honey for thereby facilitating the subsequent casting, the matrix was cast on an aluminum plate using a doctor blade method, dried for about 12 hours at ambient temperature, and then rolled under a pressure of about 1 kg/cm$^2$.

The battery fabrication and charge/discharge test were carried out using the same method as in Example 1.

Example 10

1.5 g of PAN and 1.5 g of PVdF were admixed, and 0.15 g of silica, 6.0 g of EC-DMC solution dissolved by 1M LiPF$_6$, and 10 g of EC-DMC solution as a plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form a carbon anode which is generally used for the conventional lithium ion battery, a composition of Gr (graphite) in an amount of 6 g, AB (acetylene black) in an amount of 0.3 g, and PVdF in an amount of 0.4 g was admixed with acetone 4 g and NMP (N-methyl-2-pyrrolidinone) 4 g. When the admixture became as viscous as honey for thereby facilitating the subsequent casting, the material was cast on a copper plate using a doctor blade method, dried for about 12 hours at ambient temperature, and then rolled under a pressure of about 1 kg/cm$^2$. In order to form a conventional type LiCoO$_2$ cathode, a composition of LiCoO$_2$ in an amount of 5.77 g, AB in an amount of 0.66 g, and PVdF in an amount of 0.4 g was admixed with NMP (N-methyl-2-pyrrolidinone) in an amount of 4 g and acetone in an amount of 4 g. When the admixture became as viscous as honey for thereby facilitating the subsequent casting, the material was cast on an aluminum plate using a doctor blade method, dried for about 12 hours at ambient temperature, and then rolled under a pressure of about 1 kg/cm$^2$.

The solid polymer alloy electrolyte was provided on both sides of the carbon composite anode and a lamination process was accomplished for bonding and forming a solid polymer alloy electrolyte/carbon anode/solid polymer alloy electrolyte structure, and the structure was cut to a size of 3 cm×4 cm. In addition, the conventional type LiCoO$_2$ cathode was cut to a size of 2.8 cm×3.8 cm, and then the cut structure and the cathode were alternately stacked, thereby forming a stacked structure. Then, terminals were welded to the electrodes and the terminal-welded stacked structure was placed into a blue bag. Then, the EC-EMC solution dissolved by 1M LiPF$_6$ was injected into the bag and the bag is vacuum-sealed, thereby fabricating a lithium ion polymer battery. The charge/discharge test for the battery was carried out using a charge/discharge method in which the battery is charged under C/3 constant current and 4.2V constant voltage and discharged under C/3 constant current, whereby the electrode capacity and the cycle life on the basis of the cathode were determined.

Example 11

1.5 g of PAN, 0.6 g of PMMA and 0.9 g of P(VdF-HFP) were admixed, and 0.15 g of silica, 6.0 g of EC-DMC solution dissolved by 1M LiPF$_6$, and 10 g of DMA solution as plasticizer were further admixed. The admixture was mixed for about 12 hours and heated for about one hour at a temperature of 130° C. to form a solid polymer alloy electrolyte matrix. When the matrix became as viscous as honey for thereby facilitating the subsequent casting, the matrix was cast using a doctor blade method, dried for about 12 hours at ambient temperature, thereby obtaining a solid polymer alloy electrolyte film.

In order to form the carbon composite anode, the composition of Gr (graphite) in an amount of 6 g, AB (acetylene black) in an amount of 0.3 g, and PVdF in an amount of 0.4 g was admixed with NMP (N-methyl-2-pyrrolidinone) 4 g and acetone 4 g. When the admixture became as viscous as honey, the admixture was cast on a copper plate using a doctor blade method, dried for about 12 hours at ambient temperature, and then rolled under a pressure of about 1 kg/cm$^2$. In order to form the conventional type LiCoO$_2$ composite cathode, LiCoO$_2$ 5.7 g, AB 0.6 g, and PVdF 0.4 g was admixed with NMP (N-methyl-2-pyrrolidinone) 4 g and acetone 4 g. When the admixture became as viscous as honey, the admixture was cast on an aluminum plate using a doctor blade method, dried for about 12 hours at ambient temperature, and then rolled under a pressure of about 1 kg/cm$^2$.

The battery fabrication and charge/discharge test were carried out using the same as in Example 10.

Comparative Example

According to the conventional method, 3.0 g of PAN was admixed with 9.0 g of EC-PC solution dissolved by 1M LiPF$_6$, and mixed for about 12 hours. The mixture was heated for about one hour at a temperature of 130° C. to form a solid polymer electrolyte matrix. When the matrix became as viscous as honey for thereby facilitating the subsequent casting, the matrix was cast using a doctor blade method for forming a solid polymer electrolyte film.

In order to form the carbon anode, Gr in an amount of 6 g, AB in an amount of 0.3 g, the solid polymer electrolyte (structured as above) in an amount of 3.7 and EC-PC solution in an amount of 10 g were admixed and heated for one hour at a temperature of 130° C. to sufficiently form the solid polymer electrolyte matrix. When the matrix became as viscous as honey, the matrix was cast on a copper plate using a doctor blade method, dried for about 12 hours at ambient temperature, and then rolled under a pressure of about 1 kg/cm$^2$. In order to form the LiCoO$_2$ composite cathode, LiCoO$_2$ in an amount of 5.7 g, AB in an amount of 0.6 g, the solid polymer electrolyte (structured as above) in an amount of 3.7 g, and EC-PC solution in an amount of 10 g were admixed and heated for one hour at a temperature of 130° C. to sufficiently form the solid polymer electrolyte matrix. When the matrix became as viscous as honey, the matrix was cast on an aluminum plate e using a doctor blade method, dried for about 12 hours at ambient temperature, and then rolled under a pressure of about 1 kg/cm$^2$.

The battery was formed by sequentially stacking the carbon composite anode, the solid polymer electrolyte, and LiCoO$_2$ composite cathode a few times. The electrode capacity and the cycle life were determined on the basis of the cathode under charge/discharge rate C/3.

| | PAN (g) | PMMA (g) | P(VdF-HFP) (g) | PVC (g) | organic solvent electrolyte (g) | plasticizer (g) | composite electrode plasticizer | remarks |
|---|---|---|---|---|---|---|---|---|
| Ex. 1 | 1.5 | — | 1.5 | — | EC-DMC 6 | DMA 10 | DMA 10 | |
| Ex. 2 | 1.5 | — | 1.0 | 0.5 | EC-DMC 6 | DMA 10 | DMA 10 | |
| Ex. 3 | 1.5 | 0.6 | 0.9 | — | EC-DMC 6 | DMA 10 | DMA 10 | |
| Ex. 4 | 1.5 | 1.0 | — | 1.0 | EC-DMC 6 | DMA 10 | DMA 10 | |
| Ex. 5 | — | 1.5 | 0.9 | 0.6 | EC-DMC 6 | DMA 10 | DMA 10 | |
| Ex. 6 | — | 2.0 | 1.0 | 0.5 | EC-DMC 6 | DMA 10 | DMA 10 | |
| Ex. 7 | 1.0 | 0.5 | 1.0 | 0.5 | EC-DMC 6 | DMA 10 | DMA 10 | |
| Ex. 8 | 1.0 | 0.5 | 1.0 | 0.5 | EC-DMC 6 | DMA 10 | EC-DMC | |
| Ex. 9 | 1.0 | 0.5 | 1.0 | 0.5 | EC-DMC 6 | EC-DMC 10 | EC-EMC | |
| Ex. 10 | 1.5 | — | 1.5 | — | EC-DMC 6 | EC-EMC 10 | NMP 4 + acetone 4 | prior electrode |
| Ex. 11 | 1.5 | 0.6 | 0.9 | — | EC-DMC 6 | EC-DMC 10 | NMP 4 + acetone 4 | prior electrode |
| Com. Ex. | 3.0 | — | — | — | EC-PC 9 | DMA 10 | EC-PC | |

The solid polymer alloy electrolyte commonly includes $SiO_2$ in an amount of 0.15 g.

The composite anode in each of Examples 1 through 9 includes Gr in an amount of 6 g, AB in an amount of 0.3 g and the corresponding solid polymer alloy electrolyte in an amount of 3.7 g, while the anode Examples 10 and 11 comprises Gr in an amount of 6 g, AB in an amount of 0.3 g and PVdF in an amount of 0.4 g.

Each composite cathode of Examples 1 through 9 includes $LiCoO_2$ in an amount of 5.7 g, AB in all amount of 0.6 g, the corresponding solid polymer alloy electrolyte in an amount of 3.7 g, while each cathode of Examples 10 and 11 comprises $LiCoO_2$ in an amount of 5.7 g, AB in an amount of 0.6 g and PVdF in an amount of 0.4 g.

The characteristics of the solid polymer alloy electrolyte and lithium (ion) polymer battery according to the present invention will now be explained in view of the comparison between the proceeding Examples and the Comparative Example.

First, in order to check up the ion conductivity of the solid polymer alloy electrolyte according to the present invention, the ion conductivity of the solid polymer alloy electrolyte fabricated in accordance with Examples 1 through 11 and Comparative Example as described above was measured using an impedance method, and the measurement result is shown in FIG. 1. As illustrated therein, all the solid polymer alloy electrolytes according to the present invention (Examples 1 to 11) exhibited an ion conductivity of more than $10^{-3}$ S/cm at ambient and low temperatures, and therefore can be sufficiently used as an electrolyte for a lithium (ion) polymer battery. In particular, the solid polymer alloy electrolytes according to the present invention provided an ion conductivity of about $10^{-3}$ S/cm even at a low temperature of about 0° C., which is different from the Comparative Example in which the ion conductivity drops at a low temperature, and therefore in accordance with the present invention, can obtain an improved ion conductivity at a low temperature.

Also, the adhesion and mechanical strength (or stability) of the solid polymer alloy electrolytes fabricated according to Examples 1 through 11 and the Comparative Example were measured. The measurement of the mechanical strength of the fabricated solid polymer alloy electrolyte was accomplished by measuring the tensile yield strength using UTM equipment of Instron Company in accordance with the testing method regulated under ASTM D82-88. The tensile yield strength of the conventional PAN-based solid polymer electrolyte was about 300 kgf/cm$^2$, whereas the solid polymer alloy electrolyte according to the present invention resulted in a tensile yield strength value of about 330–400 kgf/cm$^2$. Accordingly, the mechanical strength of the electrolytes according to the present invention has improved by 10 to 30%, compared to that of the conventional art.

The solid polymer electrolyte fabricated according to the Comparative Example shows a good adhesion which, however, leads to difficulty in its handling due to an excessive adhesive characteristic. Also, there is a significant problem in manufacturing a battery, since the solid polymer electrolyte of the Comparative Example has an inferior mechanical strength, thereby being inappropriate to mass production. To the contrary, the solid polymer alloy electrolytes fabricated according to the present invention exhibited a proper adhesion to the extent that the electrolyte was not separated when stacked with electrodes and to form a single structure, while having a high mechanical strength to the extent of not being torn under pulling by hand, thereby facilitating a battery fabrication. Likewise, the composite electrodes using the solid polymer alloy electrolyte have a excellent performance, thereby being highly appropriate as a solid polymer electrolyte for a lithium (ion) polymer battery.

Figure 2:
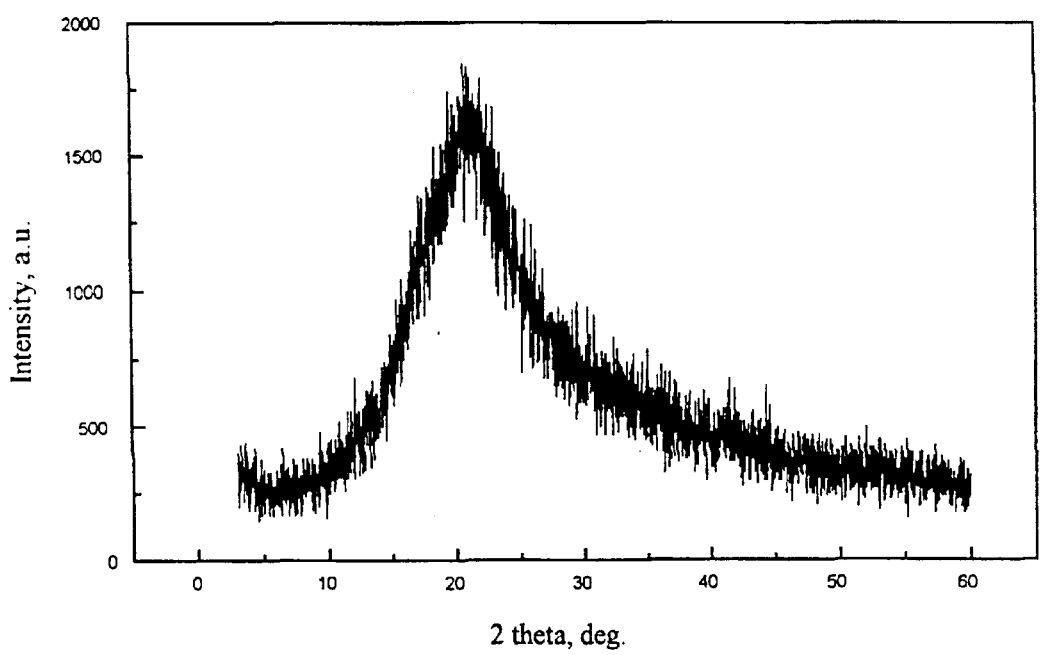
FIG. 2 is a graph illustrating an X-ray diffraction test result of the solid polymer alloy electrolyte in the homogeneous state according to the present invention, and in which the solid polymer alloy electrolyte has an amorphous structure.
Figure 3:
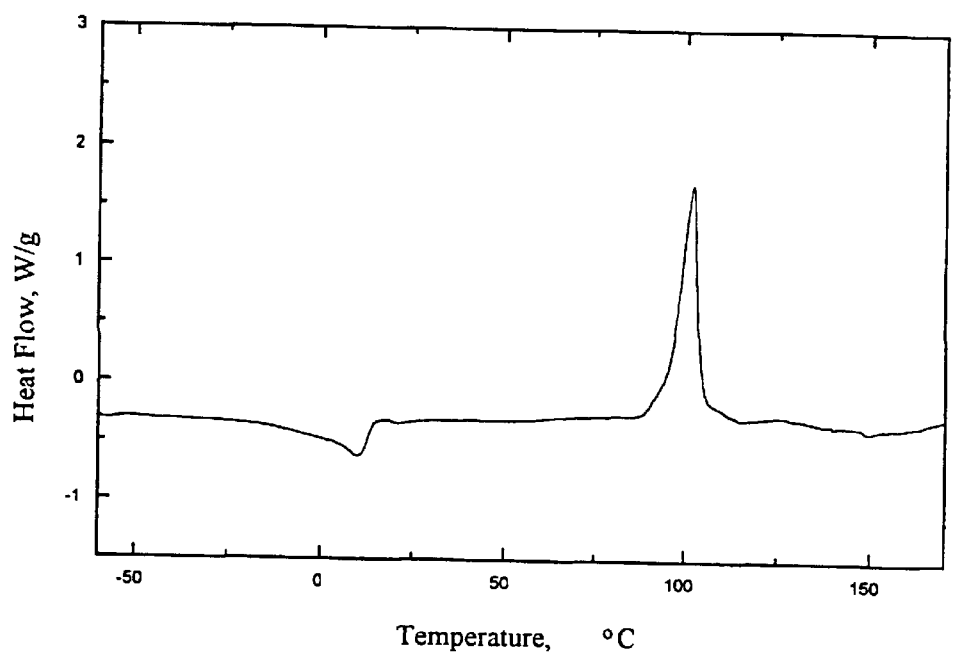
FIG. 3 is a graph illustrating a time difference scanning heat quantity analysis test result of the solid polymer alloy electrolyte in the homogeneous state according to the present invention, wherein the electrolyte has a blended homogeneous glass transition temperature region at a temperature between 90° C. and 110° C.
Figure 4:
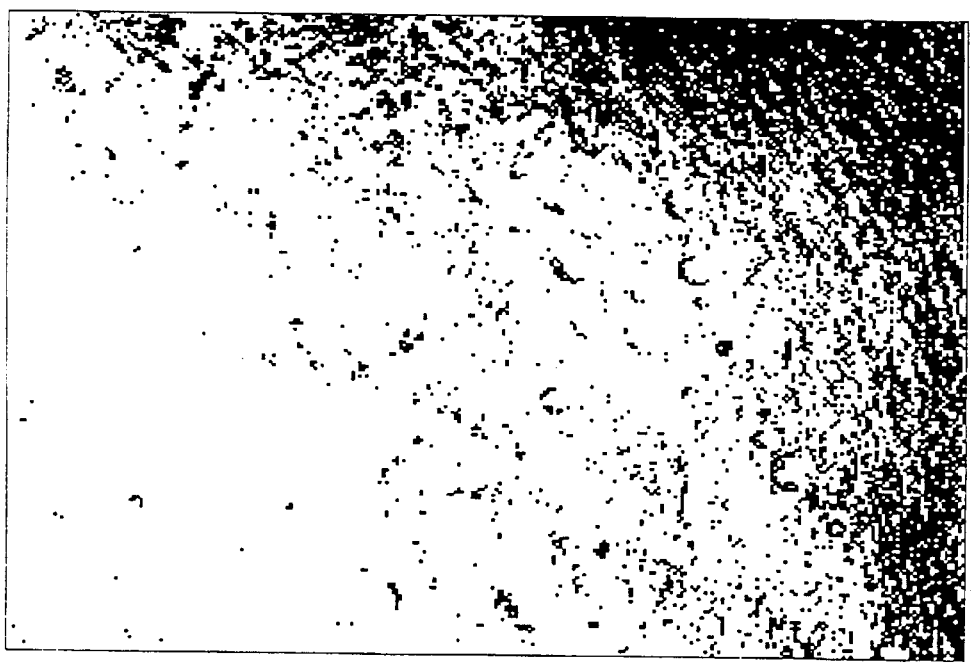
FIG. 4 illustrates the solid polymer alloy electrolyte in the homogeneous state according to the present invention as observed through an optical microscope (X50), wherein the electrolyte has a blended homogeneous and amorphous structure.

FIGS. 2 through 4 illustrate X-ray diffraction (XRD), differential scanning calorimetry (DSC) and optical microscope analytic results with regard to the solid polymer alloy electrolytes fabricated in accordance with Examples 1 through 3. The XRD results show that the solid polymer alloy electrolytes according to the present invention have a typical amorphous phase. According to DSC results, the mixed polymers are dissolved well with each other to exist in a homogeneous phase. Also, when examined using an optical microscope, it is understood that the mixed solid polymers alloy electrolyte according to the present invention are in an amorphous phase and compatible homogeneous phase since they are very transparent and do not have a separated phase.

Therefore, the present invention provides the improved compatible and homogeneous solid polymer alloy electrolytes having excellent characteristics, such as ion conductivity, compatibility with organic solvent electrolyte, and mechanical strength.

The characteristics of the lithium (ion) polymer battery fabricated using the solid polymer alloy electrolyte according to the present invention will now be described in comparison to the Comparative Example.

Figure 6:
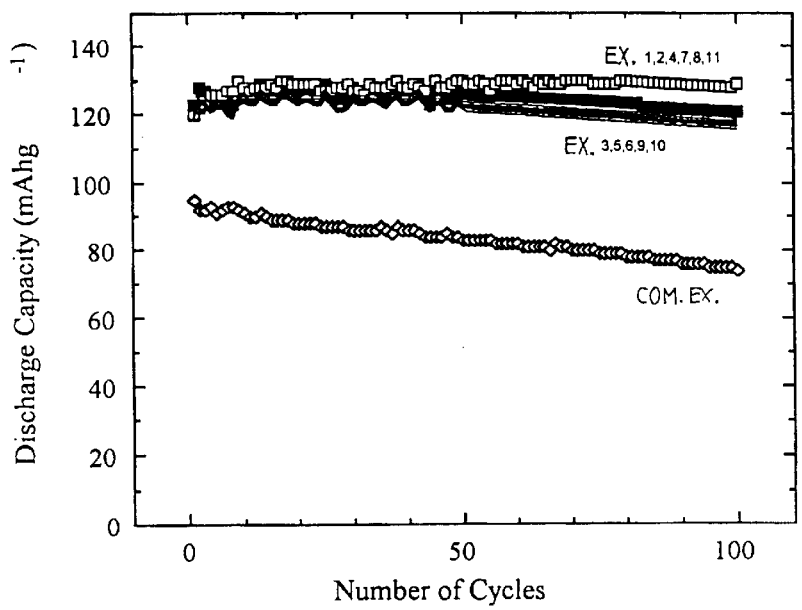
FIG. 6 is a graph illustrating the electrode capacity and life test result of the lithium ion polymer battery according to the present invention.

FIG. 6 illustrates the charge/discharge characteristics of the lithium (ion) polymer battery fabricated in accordance with Examples 1 through 11, and the Comparative Example, wherein the charge/discharge characteristics were measured using a charge/discharge method in which the battery was charged under a constant current of C/3 and constant voltage of 4.2V, and discharged under a constant current of C/3. As shown in FIG. 6, the discharge capacity and cycle characteristics of the lithium (ion) polymer battery fabricated according to the above Examples of the present invention were much better than those of the lithium polymer battery fabricated in accordance with the Comparative Example, and therefore the discharge capacity and cycle life of the battery can be improved by the present invention.

Figure 7A:
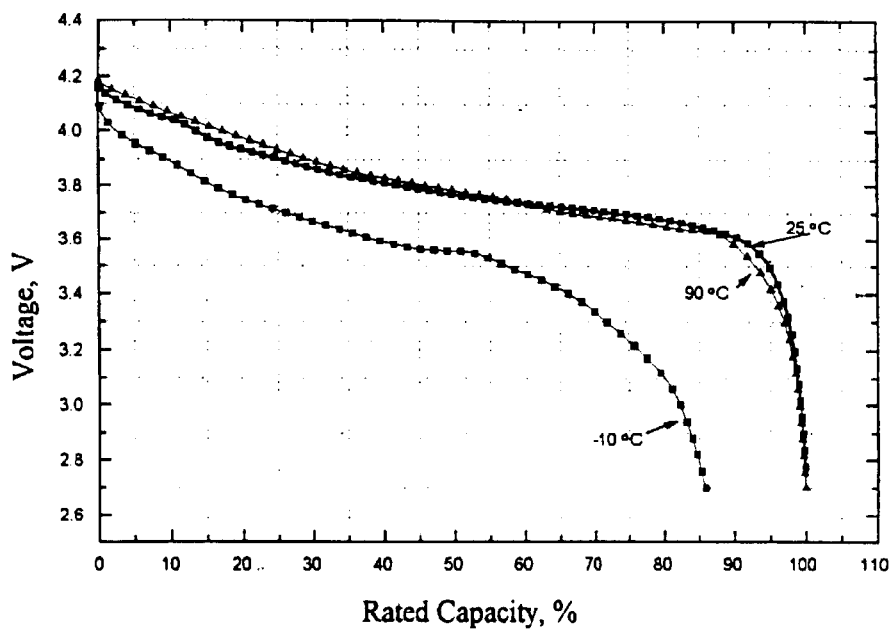
FIGS. 7a and 7b are graphs respectively illustrating low/high temperature characteristics test results of the lithium ion polymer battery (a) according to the present invention and a battery (b) according to a compared example.
Figure 7B:
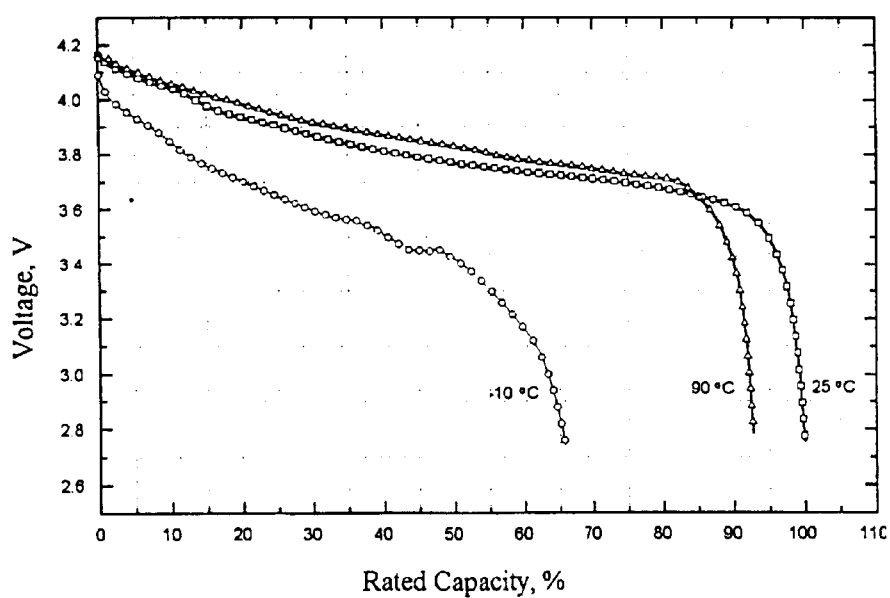

FIG. 7 shows the low and high temperature characteristics of the lithium (ion) polymer battery respectively fabricated according to Example 10 and the Comparative Example. As shown therein, the low and high temperature characteristics of the battery were measured using a charge/discharge method in which each battery was charged under a constant current of C/2 and constant voltage of 4.2V, and discharged under a constant current of C/5. With reference to the graph in FIG. 7, it is understood that the low and high temperature characteristics of the lithium (ion) polymer battery fabricated according to the above Examples of the present invention were much superior than those of the lithium polymer battery fabricated according to the Comparative Example. In particular, the battery according to the present invention shows a similar performance even at a high temperature of more than 90° C. with that at ambient temperature. Also, even at a low temperature of −10° C., its performance was as much as about 85% of that at ambient temperature. In the case of the Comparative Example, the battery had the performances of 90% and 65% at 90° C. and −10° C. respectively in comparison to those at ambient temperature.

Figure 8A:
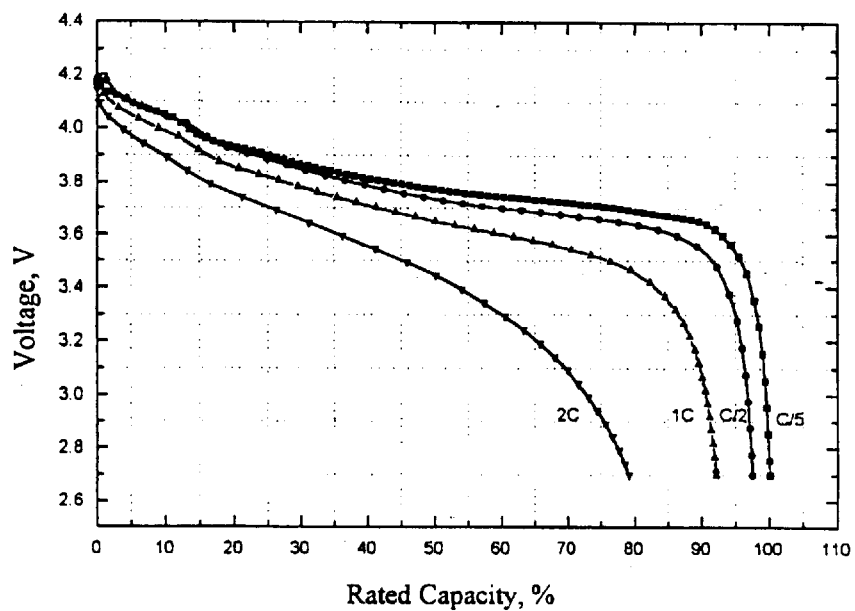
FIGS. 8a and 8b are graphs respectively illustrating high-rate discharge characteristics test results of the lithium ion polymer battery (a) according to the present invention and the battery (b) according to the compared example.
Figure 8B:
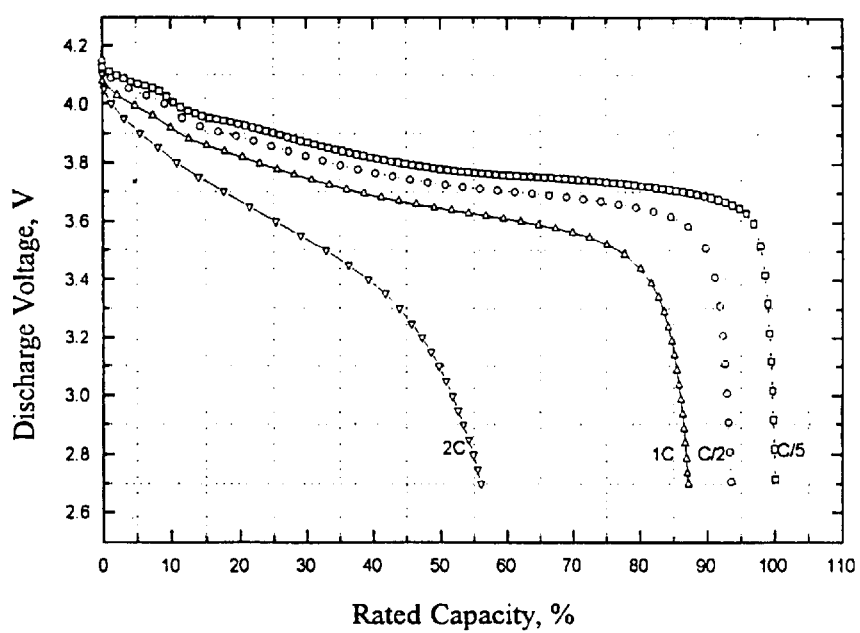

FIG. 8 illustrates the high rate discharge characteristics of the lithium (ion) polymer battery. As shown therein, the high rate discharge characteristics of the lithium (ion) polymer battery respectively fabricated in accordance with Example 10 and the Comparative Example were measured using a charge/discharge method in which each battery was charged under a static current of C/2 and static voltage of 4.2V, and then discharged under the various static currents of C/5, C/2, 1C and 2C. Referring to the graph in FIGS. 7a and 7b, the battery according to the present invention exhibited the capacities of 92% and 80% at 1C and 2C discharges (FIG. 7a), respectively, in comparison with that at 0.2C discharge, while the battery according to the Comparative Example had low performances of 87% and 56% compared with a capacity under the discharge current of 0.2C. Therefore, the high rate discharge characteristics of the lithium (ion)polymer battery fabricated according to the present invention were more excellent than those of the lithium polymer battery fabricated according to the Comparative Example.

According to the present invention, a variety of polymers with different functions are appropriately admixed to obtain improved, compatible and homogeneous solid polymer alloy electrolytes having good performance in ion conductivity, compatibility with organic solvent electrolyte, and mechanical strength.

Also, when fabricating a composite anode(cathode) using the solid polymer alloy electrolyte of the present invention and a lithium (ion) polymer battery by stacking the composite anode, composite cathode (or anode and cathode used for the conventional lithium ion battery) and the solid polymer alloy electrolyte, an improved battery adhesion and mechanical stability are realized as well as a lithium (ion) polymer battery having excellent battery performances, such as a low/high temperature characteristics, a high rate discharge characteristic, battery capacity and cycle life of battery, and therefore such battery have advantages of their applicablity to a variety of industrial fields such as compact electronic appliances, communication devices and power sources for electric vehicles.

As the present invention may be embodied in several forms without departing from the spirit of essential characteristics thereof, it should also be understood that the above-described embodiments are not limited by any of the details of the foregoing description, unless otherwise specified, but rather should be constructed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A homogeneous solid polymer alloy electrolyte having a mono-layered structure, which comprises a polymer mixture of 100 weight % comprising:
   a) 5 to 90% by weight of polyacrylonitrile-based (PAN-based) polymer;
   b) 5 to 80% by weight of one or more polymers selected from the group consisting of polyvinylidene fluoride-based polymer and poly(methylmethacrylate)-based polymer; and
   c) 5 to 80% by weight of one or more polymers selected from the group consisting of poly(vinylchloride)-based polymer and polyvinylidene fluoride-based polymer, further comprising one or more compounds selected from the group consisting of a plasticizer, an organic solvent electrolyte and one of $SiO_2$ or $Al_2O_3$, wherein the organic solvent electrolyte comprises one or more compounds selected from the group consisting of an ethylene carbonate-dimethyl carbonate (EC-DMC) solution in which a lithium salt is dissolved, an ethylene carbonate-diethyl carbonate (ED-DEC) solution in which a lithium salt is dissolved, an ethylene carbonate-ethyl methyl carbonate (ED-EMC) solution in which a lithium salt is dissolved, and said solutions further containing one or more compounds selected from the group consisting of methyl acetate (MA), methyl propionate (MP), ethyl acetate (EA) and ethyl propionate (EP) in order to improve low temperature characteristics of the above-mentioned solutions, a quantity of the organic solvent electrolyte to be added is approximately one to five times as much as the weight of the polymer mixture by weight ratio.

2. A homogeneous solid polymer alloy electrolyte having a mono-layered structure, which comprises a polymer mixture of 100 weight % comprising:
   a) 5 to 90% by weight of polyacrylonitrile-based (PAN-based) polymer;
   b) 5 to 80% by weight of one or more polymers selected from the group consisting of polyvinylidene fluoride-based polymer and poly(methylmethacrylate)-based polymer; and
   c) 5 to 80% by weight of one or more polymers selected from the group consisting of poly(vinylchloride)-based polymer and polyvinylidene fluoride-based polymer, further comprising one or more compounds selected from the group consisting of a plasticizer, an organic solvent electrolyte and one of $SiO_2$ or $Al_2O_3$, wherein one of $SiO_2$ and $Al_2O_3$ is added in order to improve the mechanical strength and ion conductivity of the solid polymer alloy electrolyte, and a quantity of one of $SiO_2$ and $Al_2O_3$ to be added is up to 20 weight % of the polymer mixture.

* * * * *